US011408470B2

(12) United States Patent
Weinhardt

(10) Patent No.: US 11,408,470 B2
(45) Date of Patent: Aug. 9, 2022

(54) METHOD FOR SYNCHRONIZING TWO DRIVE ELEMENTS OF A POWERTRAIN OF A MOTOR VEHICLE, AND POWERTRAIN FOR A MOTOR VEHICLE

(71) Applicant: AUDI AG, Ingolstadt (DE)

(72) Inventor: Mathias Weinhardt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 621 days.

(21) Appl. No.: 16/328,873

(22) PCT Filed: Sep. 7, 2017

(86) PCT No.: PCT/EP2017/072424
§ 371 (c)(1),
(2) Date: Feb. 27, 2019

(87) PCT Pub. No.: WO2018/046581
PCT Pub. Date: Mar. 15, 2018

(65) Prior Publication Data
US 2019/0186554 A1    Jun. 20, 2019

(30) Foreign Application Priority Data

Sep. 8, 2016 (DE) .................... 10 2016 217 096.1

(51) Int. Cl.
*F16H 61/04* (2006.01)
*F16D 23/04* (2006.01)
(Continued)

(52) U.S. Cl.
CPC ............. *F16D 23/04* (2013.01); *F16D 48/06* (2013.01); *F16H 61/0403* (2013.01);
(Continued)

(58) Field of Classification Search
CPC .. F16H 61/04; F16H 61/0403; F16H 61/2807; F16H 2061/047;
(Continued)

(56) References Cited

U.S. PATENT DOCUMENTS 3,708,048 A * 1/1973 Szynka ............... F16D 25/0632
192/70
4,445,602 A * 5/1984 Chana ..................... F16D 23/06
192/53.32
(Continued)

FOREIGN PATENT DOCUMENTS

CN    102221084 A    10/2011
CN    102442301 A    5/2012
(Continued)

OTHER PUBLICATIONS

Chinese Office Action dated Nov. 12, 2019, in connection with corresponding Chinese Application No. 201780055182.4 (12 pgs., including machine-generated English translation).
(Continued)

*Primary Examiner* — David R Morris
*Assistant Examiner* — Farhana Pervin
(74) *Attorney, Agent, or Firm* — Maier & Maier, PLLC

(57) ABSTRACT

A method for synchronizing a first drive element rotatable about an axis of rotation with a second drive element rotating about the axis of rotation at a target speed, of a powertrain of a motor vehicle, in which a synchronizing force is exerted on a synchronizing unit by an actuator. A speed, at which the first drive element rotates about the axis of rotation is adapted by the synchronizing unit to the target speed. The synchronizing force is increased during a first time span, so that the speed approaches the target speed. The synchronizing force is continuously reduced during a second
(Continued)

time span following the first time span, before the speed corresponds to the target speed.

11 Claims, 2 Drawing Sheets

(51) Int. Cl.
*F16D 48/06* (2006.01)
*F16H 61/28* (2006.01)
*F16D 23/06* (2006.01)

(52) U.S. Cl.
CPC .... *F16D 48/066* (2013.01); *F16D 2023/0681* (2013.01); *F16D 2500/10412* (2013.01); *F16D 2500/30415* (2013.01); *F16D 2500/30426* (2013.01); *F16D 2500/3166* (2013.01); *F16D 2500/50239* (2013.01); *F16D 2500/70404* (2013.01); *F16D 2500/70436* (2013.01); *F16D 2500/70442* (2013.01); *F16D 2500/70472* (2013.01); *F16H 2061/0474* (2013.01); *F16H 2061/2823* (2013.01)

(58) Field of Classification Search
CPC ..... F16H 2061/0474; F16H 2061/2823; F16H 2306/48; F16H 2059/6807; F16D 48/06; F16D 48/066; F16D 23/04; F16D 23/06; F16D 2023/0631; F16D 2023/0693; F16D 2023/0681; F16D 2023/25; F16D 2023/30415; F16D 2023/30426; F16D 2500/50239; F16D 2500/70472; F16D 2500/70484; F16D 2500/70436; F16D 2500/70442
See application file for complete search history.

(56) References Cited

U.S. PATENT DOCUMENTS

| | | | |
|---|---|---|---|
| 5,630,773 A | 5/1997 | Slicker et al. | |
| 6,122,583 A * | 9/2000 | Kirchhoffer | F16H 61/061 180/336 |
| 6,276,224 B1 * | 8/2001 | Ueda | F16H 61/2807 74/335 |
| 6,619,152 B2 * | 9/2003 | Ochi | F16H 61/2807 74/335 |
| 7,717,246 B2 * | 5/2010 | Hiraiwa | F16D 23/06 192/53.31 |
| 8,942,901 B2 * | 1/2015 | Lundberg | F16H 61/2807 701/68 |
| 2004/0063541 A1 | 4/2004 | Berger et al. | |
| 2004/0077457 A1 * | 4/2004 | Serebrennikov | F16H 61/2807 477/34 |
| 2007/0281823 A1 * | 12/2007 | Hun | F16D 23/06 475/303 |
| 2017/0001647 A1 * | 1/2017 | Sakamoto | F16D 48/06 |

FOREIGN PATENT DOCUMENTS

| | | |
|---|---|---|
| DE | 3447640 A1 | 7/1986 |
| DE | 19526273 A1 | 1/1997 |
| DE | 10325354 A1 | 12/2004 |
| DE | 102006042355 A1 | 3/2008 |
| DE | 102009053039 A1 | 7/2010 |
| DE | 102009021795 A1 | 12/2010 |
| WO | 2007/014636 A1 | 2/2007 |
| WO | 2011/057310 A1 | 5/2011 |

OTHER PUBLICATIONS

Office Action dated Mar. 26, 2020, in connection with corresponding Chinese Application No. 201780055182.4; 14 pages.
Examination Report dated Nov. 17, 2017 in corresponding German Application No. 10 2016 217 096.1; 13 pages.
Search Report and Written Opinion dated Dec. 22, 2017 in corresponding International Application No. PCT/EP2017/072424; 22 pages.

* cited by examiner

METHOD FOR SYNCHRONIZING TWO DRIVE ELEMENTS OF A POWERTRAIN OF A MOTOR VEHICLE, AND POWERTRAIN FOR A MOTOR VEHICLE

FIELD

The invention relates to a method for synchronizing two drive elements of a powertrain of a motor vehicle, and a powertrain for a motor vehicle.

BACKGROUND

Such a method for synchronizing a first drive element rotatable about an axis of rotation with a second drive element of a motor vehicle rotating about the axis of rotation at a target speed, in particular of an automobile, for example, a passenger automobile, is already well known from the general prior art and in particular from the mass production of vehicles. In the method, a synchronizing force is exercised on a synchronizing device by means of an actuator, whereby a speed at which the first drive element rotates about the axis of rotation is adapted by means of the synchronizing unit to the speed. This adaptation of the speed of the first drive element to the target speed of the second drive element is also referred to as synchronizing or synchronization.

The method is used, for example, in a transmission, in particular in an automated transmission or an automatic transmission, wherein the transmission is, for example, an automated shift transmission or an automated manual shift transmission, respectively. For example, the transmission can be designed as a dual-clutch transmission.

The powertrain typically comprises an electronic processing unit, which is also referred to as a control unit. The electronic control unit is designed to control the actuator in order to the set the synchronizing force and/or the exercising of the synchronizing force on the synchronizing unit. This means that the electronic processing unit controls the actuator to thus operate the actuator and at the same time control or regulate it, for example.

The adaptation of the speed to the target speed is to be understood in particular to mean that a difference between the target speed and the speed is at least reduced or preferably canceled out. It is then possible by way of the reduction, in particular the cancellation, of the difference between the speed and the target speed to connect or couple the drive elements—after the difference has been reduced or canceled out—to one another in a formfitting and thus rotationally-locked manner, without an excess strain of the powertrain and/or the occurrence of undesired noises occurring.

DE 103 25 354 A1 discloses a method for operating a powertrain of a motor vehicle, having a drive machine, a transmission, a power-operated, non-power-shift transfer case, and at least one control unit for the control of the drive machine and the transfer case. If a shift request exists for the transfer case, a shift is executed by the control unit. It is provided in this case that the control unit reduces a torque on the shift elements participating in the shifting before beginning the shifting and permits a torque on the mentioned shift elements again after completion of the shifting.

Furthermore, DE 10 2009 053 039 A1 discloses a method for controlling a powertrain of a motor vehicle, having an internal combustion engine controlled during an idle phase at a constant idle speed, having a crankshaft, a transmission, and a friction clutch acting between transmission and drive unit. It is provided in this case that during a startup phase of the motor vehicle, an interfering torque, which results because of a beginning transmission of a clutch torque via the friction clutch and reduces the idle speed, is compensated for in dependence on the presently resulting clutch torque.

Furthermore, a method for designing the locking safety of a locking element of a transmission synchronization device against shifting before establishing the synchronized running of an idler wheel with a driveshaft can be inferred as known from WO 2011/057310 A1. At least one force booster element is provided in the transmission synchronization device, which generates an axial force in addition to an axial force generated by a shift procedure, whereby a friction torque is generated in a friction element, which counteracts an unlocking torque. It is provided in this case that a variable friction torque is generated via the additional axial force and a locking safety is set which changes between a static and a dynamic locking safety.

SUMMARY

The object of the present invention is to refine a method and a powertrain of the type mentioned at the outset in such a way that particularly comfortable synchronization of the drive elements is implementable.

A first aspect of the invention relates to a method for synchronizing a first drive element rotatable about an axis of rotation with a second drive element rotating about the axis of rotation at a target speed, of a powertrain of a motor vehicle, in particular an automobile, for example, a passenger automobile. In the scope of the method, the second drive element rotates about the axis of rotation at the target speed, so that the second drive element rotating about the axis of rotation has the target speed. The first drive element can, for example, be stationary or can also rotate about the axis of rotation, for example, with respect to a rotation about the axis of rotation.

In the method, a synchronizing force is exerted on the synchronizing unit of the powertrain by means of an actuator, which is also referred to as a positioning element, whereby a speed at which the first drive element rotates about the axis of rotation is adapted by means of the synchronizing unit to the target speed. This means that by adapting the speed to the target speed and thus by synchronizing the first drive element with the second drive element, a possibly existing difference between the speed and the target speed is at least reduced, in particular canceled out. If the difference between the speed and the target speed is canceled out, the speed thus corresponds to the target speed so that, for example, synchronous running of the drive elements is provided with respect to a respective rotation about the axis of rotation.

To now be able to synchronize the drive elements in a particularly comfortable manner and, for example, as a result to be able to couple them to one another in a formfitting and thus rotationally-fixed manner in a particularly comfortable manner, it is provided according to the invention that the synchronizing force is increased during a first time span, so that the speed approaches the target speed. During a second time span following the first time span, the synchronizing force—before the speed corresponds to the target speed—is continuously reduced. It is possible by way of the method according to the invention, in particular by way of the setting of the synchronizing force according to the invention, for example, to prevent excessive jerking from occurring during the synchronizing of the drive elements, in particular in the case of a rotationally-fixed and, for example, formfitting coupling of the drive elements, which could be perceived by occupants of the motor vehicle, for example, and could be found to be unpleasant.

The invention is based on the finding in this case in particular that different methods exist in which the synchronizing unit is actuated in a targeted manner in such a way that a synchronizing force is exerted by means of a respective actuator on the respective synchronizing unit, whereby energy which is withdrawn from an output for synchronizing, to thus accelerate, for example, the first drive element representing an inertial mass, has no effects perceptible to vehicle occupants on the velocity and/or the acceleration of the motor vehicle, wherein, however, predominantly an initial actuation and thus a pressure buildup and the regulation of a consistent gradient, in particular in the scope of a pressure regulation, up to an unlocking phase, in particular a mechanical unlocking phase, are in the foreground. These methods do typically take into consideration that an introduction of an interfering torque on a wheel of the motor vehicle for the purpose of synchronization has to be adapted during a corresponding driving situation, however, it is not taken into consideration that a sudden mechanical decoupling takes place at the end of the synchronization for mechanical reasons, which is also referred to as unlocking or an unlocking procedure.

In the scope of the unlocking, for example, a synchronizer ring enables a displacement of a shift collar, so that the shift collar can be displaced in relation to the synchronizer ring, to thus, for example, couple the drive elements with one another in a formfitting and rotationally-locked manner. Because the unlocking typically takes place suddenly, an additional torque for driving the above-mentioned wheel and/or the motor vehicle as a whole is suddenly available, whereby a sudden acceleration of the motor vehicle perceptible by occupants of the motor vehicle can occur. Such a sudden acceleration of the motor vehicle can be avoided by means of the method according to the invention, since the synchronizing force, after it was increased during the first time span, in particular at least essentially continuously, is reduced during the second time span at least essentially continuously, wherein the at least essentially continuous reduction of the synchronizing force can be begun before the speed has reached the target speed, i.e., before the speed corresponds to the target speed. Therefore, by way of the method according to the invention, an interfering torque which occurs at a wheel of the motor vehicle and undesirably influences the travel velocity and/or the acceleration of the motor vehicle can be kept particularly small or avoided.

The method according to the invention is to be carried out particularly advantageously in this case in driving situations in which a drive torque for driving the wheel and/or the motor vehicle as a whole is very small. This drive torque is provided, for example, by at least one drive motor of the powertrain, wherein the drive motor can be designed, for example, as an internal combustion engine or, however, as an electric machine or as an electric motor, respectively. It has been found that at low drive torques, even very small interfering torques on the wheel and thus even extremely small changes of the travel velocity and/or the acceleration of the motor vehicle caused by the synchronization of the drive elements can be perceived by occupants of the motor vehicle, which can now be avoided by means of the method according to the invention, however.

For example, it is provided in the scope of the method that the speed of the first drive element is initially less than the target speed, so that in the scope of the synchronizing of the drive elements, the speed of the first drive element is increased and thus adapted to the target speed. For this purpose, the first drive element is accelerated, for example, wherein it can be provided that the first drive element is accelerated by means of and/or via the synchronizing unit by the second drive element and thus by energy provided by the second drive element. The synchronizing unit is preferably designed as a friction synchronizing unit or friction synchronization unit, so that in the scope of the synchronizing, the speed is adapted to the target speed by friction. It is therefore provided, for example, that the first drive element is firstly coupled in a friction-locked manner with the second drive element via the synchronizing unit, whereby the first drive element is accelerated. After a sufficient reduction, in particular after cancellation of the difference between the speed and the target speed, the synchronizing unit can be interconnected, for example, whereby the drive elements are coupled to one another in a formfitting and thus rotationally-locked manner, for example, via the synchronizing unit. In particular the above-mentioned, in particular mechanical unlocking procedure can take place after sufficient reduction, in particular after cancellation of the difference between the speed and the target speed, so that the drive elements can be coupled to one another in a formfitting and thus rotationally-locked manner, for example, via the above-mentioned shift collar.

In one advantageous embodiment of the invention, the synchronizing force is continuously reduced during the second time span in such a way that the speed of the first drive element further approaches the target speed. An at least essentially continuous reduction of the synchronizing force does take place during the second time span, however, an approach of the speed to the target speed is thus furthermore effectuated, so that preferably a synchronization of the first drive element with a second drive element also takes place during the second time span. The time required for synchronizing the drive elements can thus be kept particularly short, wherein furthermore particularly comfortable synchronization is implementable.

It has proven to be particularly advantageous if the synchronizing force is continuously reduced during the second time span in such a way that the speed further approaches the target speed, in particular until the speed corresponds to the target speed. In this way, for example, a possibly existing difference between the speed and the target speed is canceled out, i.e., reduced to zero, for example, so that then as a result particularly comfortable and smooth formfitting and thus rotationally-locked coupling of the drive elements can be performed.

It has proven to be particularly advantageous if the synchronizing force is continuously reduced during the second time span before a mechanical unlocking phase begins. The mechanical unlocking phase corresponds, for example, to the above-described mechanical unlocking procedure or the unlocking. During the mechanical unlocking, a synchronizer ring of the synchronizing unit enables a sliding collar of the synchronizing unit for displacement of the sliding collar along the axis of rotation. In particular, the synchronizer ring only enables the displacement of the sliding collar when the difference between the speed and the target speed has been sufficiently reduced, in particular canceled out. After the synchronizer ring has enabled the sliding collar for its displacement along the axis of rotation, the sliding collar is displaced along the axis of rotation in relation to the synchronizer ring, in particular by means of the synchronizing force, and is thus engaged with corresponding gear teeth, to thus couple the drive elements in a formfitting and rotationally-locked manner with one another via the gear teeth and the sliding collar.

By way of the described enabling, the sliding collar can thus be interconnected, to thus couple the drive elements with one another in a formfitting and thus rotationally-locked manner. For example, the synchronizing unit operates according to the well-known Borg-Warner principle, so that the synchronizing unit is, for example, of the well-known Borg-Warner type. This embodiment is thus based on the concept of continuously decreasing, i.e., reducing, the synchronizing force applied to the synchronizing unit, for example, in certain driving situations, in particular in low and thus comfort-relevant load ranges, to enable an at least essentially harmonic torque curve on the wheel, before the mechanical unlocking phase begins. The interfering torque is ideally dissipated completely up to this point in time, so that a particularly high level of comfort, in particular a particularly high level of shifting comfort can be implemented, in particular in driving situations in which the drive torque is very low.

To implement a particularly comfortable synchronization of the drive elements, it is provided in a further embodiment of the invention that the synchronizing force is increased during a third time span following the second time span. In this way, for example, the drive elements can be coupled with one another in a formfitting and thus rotationally-locked manner particularly securely.

It has proven to be particularly advantageous in this case if the synchronizing force is increased linearly during the third time span, to thus implement a particularly high level of comfort.

A further embodiment is distinguished in that, as the first drive element, a gear wheel of a transmission is synchronized with the second drive element, to thus implement particularly comfortable shifting.

In this case, it is provided in a further embodiment of the invention that the gear wheel is synchronized with the second drive element during a gear change of the transmission. A particularly comfortable gear change, i.e., a particularly comfortable shifting of the transmission can thus be implemented by means of the method according to the invention, which transmission is designed, for example, as an automatic transmission or as an automated shift transmission, in particular as an automated manual shift transmission. In particular, the transmission is designed, for example, as a dual-clutch transmission.

Finally, it has been shown to be particularly advantageous if a shaft, which is driven by at least one wheel of the motor vehicle, is used as the second drive element. In this case, for example, the gear wheel can be coupled in a formfitting manner to the shaft and thus connected in a rotationally-locked manner via the sliding collar and the gear teeth, in particular in the scope of a gear change of the transmission. Furthermore, it is conceivable that the first drive element is a further shaft of the powertrain.

A second aspect of the invention relates to a powertrain for a motor vehicle, in particular for an automobile, for example, a passenger automobile. The powertrain comprises a first drive element rotatable about an axis of rotation and a second drive element rotatable about the axis of rotation. Furthermore, the powertrain comprises a synchronizing unit for synchronizing the first drive element with the second drive element. Furthermore, an actuator is provided, by means of which a synchronizing force can be exerted on the synchronizing unit, to thus adapt a speed of the first drive element to a target speed of the second drive element by means of the synchronizing unit. By means of the synchronizing force, for example, the synchronizing unit, in particular at least one synchronizing element of the synchronizing unit, is moved, in particular displaced, along the axis of rotation, in particular in relation to the drive elements, to thus synchronize the drive elements, i.e., to thus adapt the speed to the target speed.

The powertrain furthermore comprises an electronic processing unit, which is also referred to as a control unit and is designed to control the actuator, to thus set the exertion of the synchronizing force on the synchronizing unit.

To implement particularly comfortable synchronizing of the drive elements, it is provided according to the invention that the electronic processing unit is designed to control the actuator in such a way that the synchronizing force increases during a first time span, so that the speed approaches the target speed. Furthermore, the electronic processing unit is designed to operate the actuator in such a way that the synchronizing force is continuously reduced during a second time span following the first time span, before the speed corresponds to the target speed. Advantages and advantageous embodiments of the first aspect of the invention are to be considered as advantages and advantageous embodiments of the second aspect of the invention and vice versa.

Further advantages, features, and details of the invention result from the following description of a preferred exemplary embodiment and on the basis of the figure(s). The features and feature combinations mentioned above in the description and also the features and feature combinations mentioned hereafter in the description of the figure(s) are usable not only in the respective specified combination but rather also in other combinations or alone, without leaving the scope of the invention.

DETAILED DESCRIPTION

Figure 2:
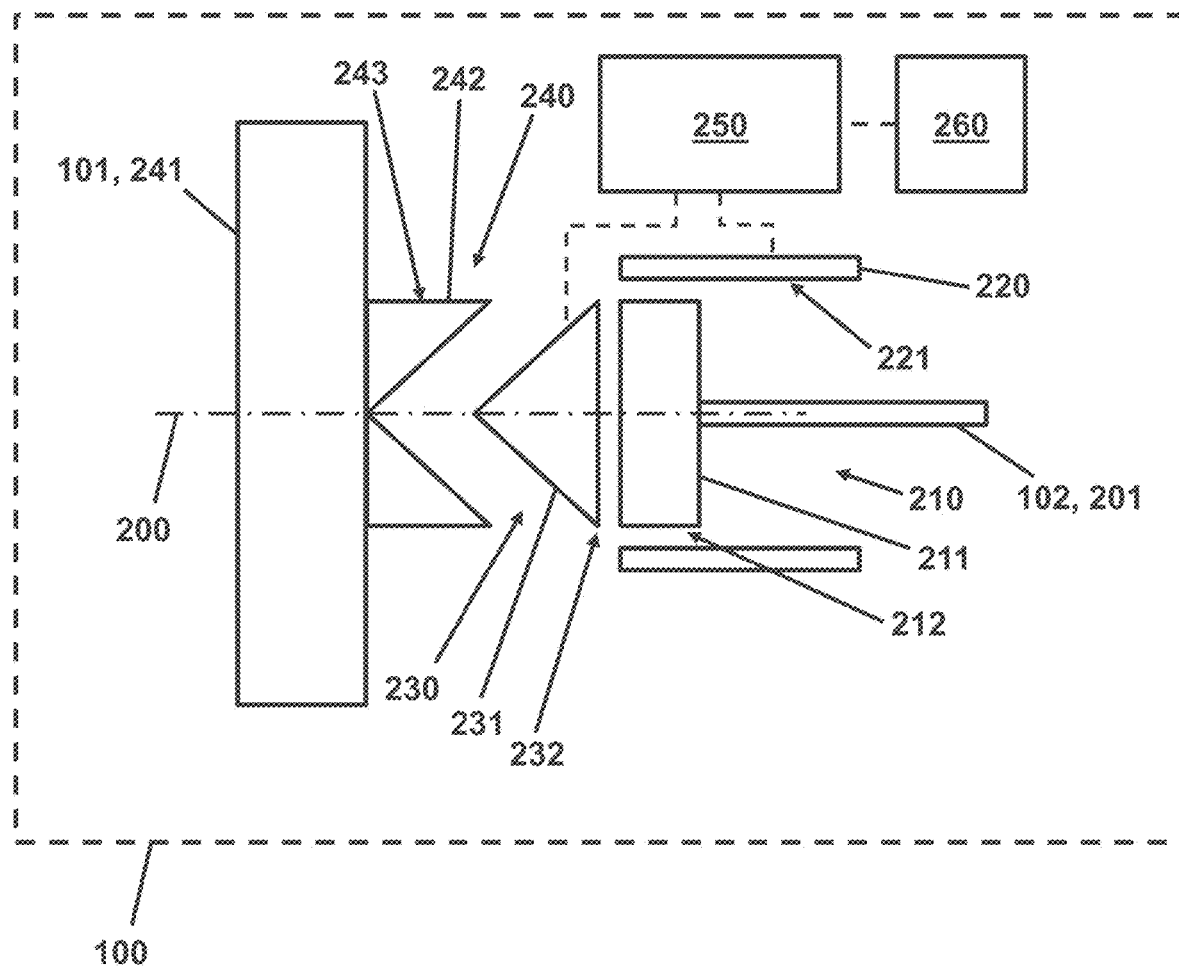

FIG. 2 shows a schematic representation of a powertrain of a motor vehicle according to the invention.

A method for synchronizing a first drive element rotatable about an axis of rotation with a second drive element rotating about the axis of rotation at a target speed, of a powertrain of a motor vehicle, in particular an automobile, for example, a passenger automobile, will be explained hereafter on the basis of the FIGURE. In the scope of the method, for example, the second drive element rotates at the target speed about the axis of rotation, so that the second drive element has the target speed. In this case, the target speed is different from 0 and/or has a value different from 0.

The first drive element is stationary with respect to a rotation about the axis of rotation, for example, so that the first drive element initially does not rotate about the axis of rotation, for example. Furthermore, it is conceivable that the first drive element rotates at a speed, in particular at a speed different from 0, about the axis of rotation, wherein the speed is different, for example, from the target speed. In particular the speed is, for example, less than the target speed, so that, for example, the first drive element is accelerated in the scope of the synchronizing, and so that the speed of the first drive element is increased.

Figure 1:
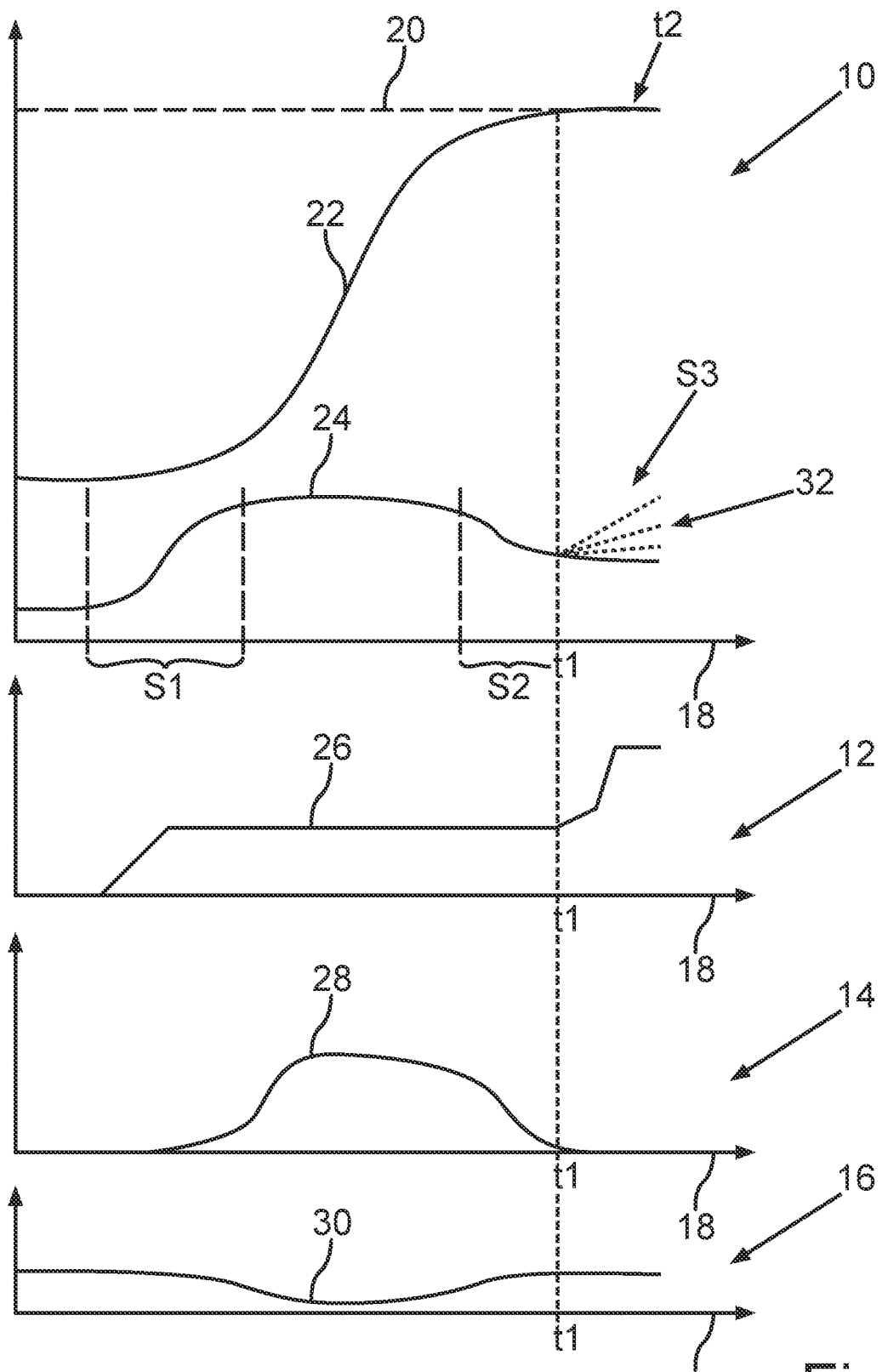
FIG. 1 shows diagrams to illustrate a method according to the invention for synchronizing two drive elements of a powertrain of a motor vehicle.

FIG. 1 shows a plurality of diagrams 10, 12, 14, and 16, on the respective ordinate 18 of which the time t is plotted. The method is applied, for example, in a transmission of the powertrain. The powertrain comprises in this case the transmission and at least one drive motor, which can provide torques for driving at least one wheel of the motor vehicle and thus for driving the motor vehicle as a whole. The respective torque provided by the drive motor is transmitted, for example, via the transmission and at least one shaft to the at least one wheel, whereby the wheel can be driven by means of the torque. The method is carried out in particular during a drive of the motor vehicle, wherein the motor vehicle is driven along a roadway during the drive. In this case, the at least one wheel rolls on the roadway.

The transmission has, for example, a plurality of gears which can be engaged and/or shifted. A shifting and/or a gear change of the transmission is thus to be understood to mean that a first of the gears is disengaged and a second of the gears is engaged. In this case, for example, the first drive element is a gear wheel of the second gear, wherein the second drive element is, for example, the above-mentioned shaft, via which the wheel is drivable. In particular, the wheel is driven via the shaft by the drive motor in a traction operation of the drive motor. For this purpose, a torque flow takes place from the drive motor via the transmission to the shaft and via this shaft to the wheel. In the event of a gear change, for example, this torque flow between the drive motor and the shaft, in particular between the drive motor and the transmission, is interrupted, for example, by a starting element such as a friction clutch being opened. The shaft is then driven by the at least one wheel, for example, so that the shaft (second drive element) rotates at the target speed about the axis of rotation.

Since initially the first gear is or was, respectively, engaged and the first gear is disengaged and the second gear is engaged in the scope of the gear change, for example, the first drive element formed as the gear wheel of the second gear does not rotate about the axis of rotation, or the first drive element rotates at a lower speed than the target speed about the axis of rotation.

In the method for synchronizing the drive elements, a synchronizing force is exerted on a synchronizing unit by means of an actuator, whereby the speed at which the first drive element rotates about the axis of rotation is adapted by means of the synchronizing unit to the target speed. This means that a difference between the speed of the first drive element and the target speed of the second drive element is at least reduced, in particular canceled out. Since, for example, the speed is less than the target speed, the first drive element is accelerated by the second drive element via the synchronizing unit, whereby the speed of the first drive element is increased and the target speed is thus approached.

The synchronizing unit is designed, for example, as a friction synchronizing unit of the powertrain 100. In this case, the synchronizing unit 210 comprises, for example, a carrier connected in a rotationally-fixed manner to the shaft 201, which is referred to as a synchronizer hub 211. The synchronizer hub 211 has, for example, first gear teeth 212. Furthermore, the synchronizing unit 210 comprises a sliding collar 220, which is partially arranged on the synchronizer hub 211 and is displaceable along the axis of rotation 200 in relation to the synchronizer hub 211. In this case, the sliding collar 220 has second gear teeth 221, which are at least partially engaged with the first gear teeth 212. Furthermore, the synchronizing unit 210 comprises, for example, at least one synchronizer ring 230, which has a first friction cone 231. Moreover, the synchronizing unit 210 comprises a clutch body 240, which is connected, for example, in a rotationally-fixed manner to the gear wheel 241 and has a second friction cone 242 corresponding to the first friction cone 231. The first friction cone 231 and the second friction cone 242 form a cone friction clutch, which can be opened and closed by displacing the synchronizer ring 230 along the axis of rotation in relation 200 to the clutch body 240. In this case, for example, the synchronizer ring has 230, for example, third gear teeth 232, wherein the clutch body has fourth gear teeth 243. Since the sliding collar 220 engages via its second gear teeth 221 in the first gear teeth 212 of the synchronizer hub 211, and since the synchronizer hub 211 is coupled in a rotationally-fixed manner to the second drive element 102, the sliding collar 220 is driven via the synchronizer hub 211 and at the same time via the first gear teeth 212 and the second gear teeth 221 by the second drive element 102, which is driven by the at least one wheel. Therefore, the synchronizer hub 211 and the sliding collar 220 also rotate at the target speed about the axis of rotation 200. Before the synchronization, the clutch body 240 and the first drive element 101 are not coupled to the second drive element 102, so that they can rotate in relation to one another.

The synchronizer ring is, for example, at least indirectly coupled to the synchronizer hub, so that the synchronizer hub carries along the synchronizer ring. This means that the synchronizer ring is rotated via the synchronizer hub by the second drive element about the axis of rotation, so that the synchronizer ring also rotates at the target speed about the axis of rotation.

In the scope of the gear change, the drive elements are synchronized by exerting the synchronizing force on the synchronizing unit and in this case in particular on the sliding collar by means of the actuator. By means of the synchronizing force, the sliding collar and, at least indirectly via this, the synchronizer ring are displaced in the direction of the gear wheel and thus in the direction of the clutch body, which is connected in a rotationally-fixed manner to the gear wheel, along the axis of rotation, so that the first friction cone comes into contact with the second friction cone. Thus, for example, the clutch body and the gear wheel are at least approximately brought to the speed of the synchronizer ring. This takes place in particular in the scope of a pre-synchronization. In other words, the difference between the speed and the target speed is at least reduced by the pre-synchronization. If the sliding collar is displaced further, for example, in particular by means of the synchronizing force, in the direction of the gear wheel and the clutch body, the sliding collar, in particular its second gear teeth, thus comes into contact with the synchronizer ring, in particular with the third gear teeth. In this way, the synchronizer ring is pressed by means of the sliding collar particularly strongly against the clutch body, so that the first friction cone and the second friction cone are pressed together. In this way, for example, a friction cone clutch formed by the friction cones is closed or closed further, respectively. Firstly, for example, the synchronizer ring locks the sliding collar against a displacement of the sliding collar along the axis of rotation in the direction of the clutch body, in particular as long as the difference between the speed and the target speed has not yet been sufficiently reduced or canceled out.

If the difference between the speed and the target speed has been sufficiently reduced, in particular canceled out, so that, for example, the second drive element and thus the sliding collar have the same speed as the clutch body and thus the gear wheel, the synchronizer ring enables the sliding collar for its displacement along the axis of rotation along the clutch body, since then the synchronizer ring can be pivoted in relation to the sliding collar and in relation to the clutch body about the axis of rotation, by the sliding collar being displaced along the axis of rotation in the direction of the clutch body. Thus, for example, the second gear teeth of the sliding collar can be pushed through the third gear teeth of the synchronizer ring, in particular through tooth gaps of the third gear teeth of the synchronizer ring and in particular can be moved or pushed, respectively, into engagement with the fourth gear teeth of the clutch body. The second gear teeth of the sliding collar then engages both in the first gear teeth of the synchronizer hub and also in the fourth gear teeth of the clutch body, so that the second drive element is coupled in a formfitting and thus rotationally-fixed manner with the first drive element via the sliding collar and the clutch body.

The enabling of the sliding collar for its displacement along the axis of rotation in the direction of the clutch body is also referred to as a mechanical unlocking phase, unlocking procedure, mechanical unlocking procedure, unlocking, or mechanical unlocking, so that the synchronizing unit is designed, for example, as a locking synchronizing unit. The sliding collar can be interconnected by the unlocking, which is to be understood to mean that the sliding collar or its second gear teeth, respectively, is/are engaged with the fourth gear teeth.

To make the described synchronization of the drive elements and thus the gear change particularly comfortable and in particular smooth for occupants of the motor vehicle, it is provided in the method that the synchronizing force is increased during a first time span, so that the speed of the first drive element approaches the target speed of the second drive element. Before the speed corresponds to the target speed, in particular chronologically before the mechanical unlocking force, the synchronizing force is continuously reduced during a second time span following the first time span.

In the diagram 10, the target speed is identified by 20 and is illustrated by means of a dashed line. The target speed is also referred to as the synchronizing target speed. Furthermore, a curve 22 is plotted in the diagram 10, which illustrates the speed of the first drive element, in particular a time curve of the speed of the first drive element. Furthermore, a point in time t1 is plotted in the diagrams 10, 12, 14, and 16, at which the mechanical unlocking phase begins. In addition, a curve 24 is plotted in the diagram 10, which illustrates the synchronizing force, in particular its time curve. In this case, the first time span is identified by s1, wherein the second time span is identified by s2. It is particularly well recognizable on the basis of the diagram 10 that the at least essentially continuous reduction of the synchronizing force begins before the point in time t1 and thus before the mechanical unlocking phase, so that the synchronizing force—after it was increased—is continuously reduced, before the unlocking takes place.

A curve 26 is plotted in the diagram 12, which illustrates a gear selector path. The gear selector path is a path over which a gear selector is moved, in particular by means of a further actuator or by means of the actuator. The first gear is disengaged and the second gear is engaged, for example, by means of the gear selector. In particular, the sliding collar is displaced in the described manner along the axis of rotation by means of the gear selector and is thus moved into engagement with the clutch body or the fourth gear teeth, respectively.

The actuator 250 for exerting the synchronizing force can be designed as an electric or electromechanical actuator and/or as a pneumatic actuator and/or as a hydraulic actuator. In particular, the actuator can be designed as a hy-draulic actuator, so that the synchronizing force is effectuated, for example, by means of a hydraulic fluid, in particular by means of a pressure of the hydraulic fluid. The actuator may be controlled by electronic processing unit 260. Thus, for example, the curve 24 illustrates a pressure, in particular a target pressure of the hydraulic fluid, by means of which the synchronizing force is finally effectuated.

A curve 28 is plotted in the diagram 14, which illustrates an interfering torque applied to the at least one wheel and/or acting on the at least one wheel. A curve 30 is plotted in the diagram 16, which illustrates a torque of the wheel. It is particularly well recognizable from the FIGURE that a harmonic or harmonized dissipation of the interfering torque illustrated by the curve 28 is implementable by the described setting of the synchronizing force, so that the method is designed as a method for harmonized interfering torque cessation during the synchronizing in the transmission. For example, at a point in time t2, which chronologically follows the point in time t1, for example, the first drive element reaches the target speed, which is also referred to as the synchronization speed. Before the speed of the first drive element corresponds to the target speed, i.e., before the speed reaches the target speed, the interfering torque on the wheel is at least reduced or is completely canceled out by the synchronizing force being reduced essentially continuously before the speed reaches the target speed and/or before the mechanical unlocking phase begins.

During the synchronizing, for example, the maximum permissible gradient, in particular of the curve 22, is limited as a function of the difference between the speed and the target speed during the approach of the speed to the target speed. The required synchronizing force to set, in particular to adjust, the limited and therefore required gradient is thus reduced. Due to the reduction of the synchronizing force, the first drive element to be synchronized accelerates significantly more slowly in comparison to methods in which the synchronizing force is not reduced, whereby the torque taken from the drive is reduced by the same amount. Thus, at the point in time t1 of the beginning of the mechanical unlocking phase, the interfering torque at the wheel is already dissipated enough that the torque-side decoupling of the accelerating drive element has a neutral effect in the torque balance. At the same time, a substantial increase of the synchronizing duration can be avoided by this measure, since the maximum gradient remains unchanged by the force-reducing measure. Particularly rapid and comfortable synchronization can thus be implemented.

It is recognizable from the FIGURE on the basis of the diagram 10 that a third time span s3 can follow the second time span s2, during which the synchronizing force is increased, in particular linearly. Therefore, possible designs of the curve 24 are illustrated in the diagram 10 by dashed lines 32, so that different embodiments of the curve 24 and thus different time curves of the synchronizing force are illustrated on the basis of the dashed lines 32.

The invention claimed is:
1. A method for synchronizing a first drive element rotatable about an axis of rotation with a second drive element rotating about the axis of rotation at a target speed, of a powertrain of a motor vehicle, comprising:
 exerting a synchronizing force on a synchronizing unit by an actuator, the synchronizing unit comprising a friction clutch, whereby the synchronizing unit adapts a speed at which the first drive element rotates about the axis of rotation to the target speed,
 wherein, during a first time span in which the friction clutch has closed and begins to adapt the speed at which the first drive element rotates, the synchronizing force is increased as the speed approaches the target speed, wherein, during a second time span which follows the first time span but occurs before the speed corresponds to the target speed, the synchronizing force is reduced as the speed further approaches the target speed, wherein, during a third time span which follows the second time span and begins when the speed corresponds to the target speed, the synchronizing force is increased, and wherein, across at least the first, second, and third time spans, the synchronizing force is increased and reduced in a continuous manner.

2. The method as claimed in claim 1, wherein the synchronizing force is reduced during the second time span until the speed corresponds to the target speed.

3. The method as claimed in claim 1, wherein the synchronizing force is reduced during the second time span, before a mechanical unlocking phase begins, during which a synchronizer ring enables a sliding collar for a displacement of the sliding collar along the axis of rotation, and wherein the sliding collar is displaced along the axis of rotation in relation to the synchronizer ring and is thus engaged with corresponding gear teeth to couple the first and second drive elements in a formfitting and friction-locked manner with one another via the gear teeth and the sliding collar.

4. The method as claimed in claim 1, wherein the synchronizing force is increased linearly during the third time span.

5. The method as claimed in claim 1, wherein as the first drive element, a gear wheel of a transmission is synchronized with the second drive element.

6. The method as claimed in claim 5, wherein the gear wheel is synchronized with the second drive element during a gear change of the transmission.

7. The method as claimed in claim 1, wherein a shaft, which is driven by at least one wheel of the motor vehicle, is used as the second drive element.

8. The method as claimed in claim 1, wherein the friction clutch is a friction cone clutch.

9. A powertrain for a motor vehicle, comprising:
a first drive element rotatable about an axis of rotation,
a second drive element rotatable about the axis of rotation,
a synchronizing unit for synchronizing the first drive element with the second drive element, the synchronizing unit comprising a friction clutch,
an actuator, by which a synchronizing force can be exerted on the synchronizing unit to thus adapt a speed of the first drive element to a target speed of the second drive element by the synchronizing unit, and
an electronic processing unit, which is configured to control the actuator to thus set the exertion of the synchronizing force on the synchronizing unit,
wherein the electronic processing unit is configured to control the actuator such that:
during a first time span in which the friction clutch has closed and begins to adapt the speed at which the first drive element rotates, the synchronizing force is increased as the speed approaches the target speed;
during a second time span which follows the first time span but occurs before the speed corresponds to the target speed, the synchronizing force is reduced as the speed further approaches the target speed; and
during a third time span which follows the second time span and begins when the speed corresponds to the target speed, the synchronizing force is increased, and
wherein, across at least the first, second, and third time spans, the synchronizing force is increased and reduced in a continuous manner.

10. The powertrain as claimed in claim 9, wherein the friction clutch is a friction cone clutch.

11. The powertrain as claimed in claim 9, wherein the synchronizing force is increased linearly during the third time span.

* * * * *